United States Patent [19]

Budin et al.

[11] Patent Number: 4,692,746
[45] Date of Patent: Sep. 8, 1987

[54] RECORDING-TAPE-REEL ASSEMBLY WITH ELECTRONIC TAG

[75] Inventors: Richard J. Budin, Clearwater; James G. Wyatt, Jr., Treasure Island; Fred W. Herman, Tampa, all of Fla.

[73] Assignee: Security Tag Systems, Inc., St. Petersburg, Fla.

[21] Appl. No.: 833,824

[22] Filed: Feb. 26, 1986

[51] Int. Cl.4 ............................................. G08B 13/24
[52] U.S. Cl. .................................. 340/572; 360/132; 360/137
[58] Field of Search ............... 340/572; 360/134, 132, 360/137

[56] References Cited

U.S. PATENT DOCUMENTS 4,075,618  2/1978  Montean ........................... 360/132
4,481,428  11/1984 Charlot, Jr. ....................... 307/219.1

Primary Examiner—Glen R. Swann, III
Attorney, Agent, or Firm—Edward W. Callan

[57] ABSTRACT

A recording-tape-reel assembly, such as used with a computer, has an electronic tag to enable the presence of the assembly to be detected in a presence detection system in order to inhibit the unauthorized removal of the assembly from premises equipped with such a system. The assembly includes a reel for holding a recording tape, an electronic tag for enabling detection of the presence of the assembly in a presence detection system, and a housing that isolates the electronic tag from the recording tape and makes the tag inaccessible to users of the assembly. Electronic tags are housed in both reels and cassettes that contain reels.

5 Claims, 9 Drawing Figures

RECORDING-TAPE-REEL ASSEMBLY WITH ELECTRONIC TAG

BACKGROUND OF THE INVENTION

The present invention generally pertains to recording-tape-reel assemblies and is particularly directed to inhibiting the theft of such assemblies.

Recording-tape-reel assemblies are assemblies in which a recording tape is wound on a reel. In some such assemblies the reel is contained in a cassette.

Recording tapes contained in such assemblies often contain valuable information and are commonly used in data processing operations to store data and computer programs.

There is a need to inhibit the theft of such assemblies.

SUMMARY OF THE INVENTION

The present invention provides a recording-tape-reel assembly for use in a presence detection system to inhibit the unauthorized removal of such assembly from premises equipped with such a system.

The assembly of the present invention includes a reel for holding a recording tape, an electronic tag for enabling detection of the presence of the assembly in a presence detection system, and a housing that isolates the electronic tag from the recording tape and makes the tag inaccessible to users of the assembly.

By isolating the electronic tag from the tape, any debris that may be derived from the tag is prevented from coming in contact with the tape.

The electronic tag is made inaccessible to users of the assembly so that it cannot be removed from the assembly.

In one aspect of the present invention, the reel includes a hub on which said tape is wound and flanges attached on opposite sides of the hub; one exterior side of the hub defines a slot; the tag is disposed in said slot; and one of the flanges covers the slot to isolate the tag from said tape and to make the tag inaccessible to users of the assembly.

In another aspect of the present invention, the reel is contained within a cassette that includes interior walls defining an enclosed compartment that is isolated from the tape and inaccessible to users of the device; the tag is positioned in the compartment; the tag includes first and second inductance coils; the compartment has two interconnected chambers, including one chamber that is circular and parallel to one wall of the cassette; the first coil has a diameter corresponding to the diameter of the circular chamber and is positioned in the circular chamber; and the second coil is positioned in the other chamber orthogonally to the first coil.

Additional features of the present invention are discussed in relation to the description of the preferred embodiments.

DESCRIPTION OF THE PREFERRED EMBODIMENTS

Figure 1:
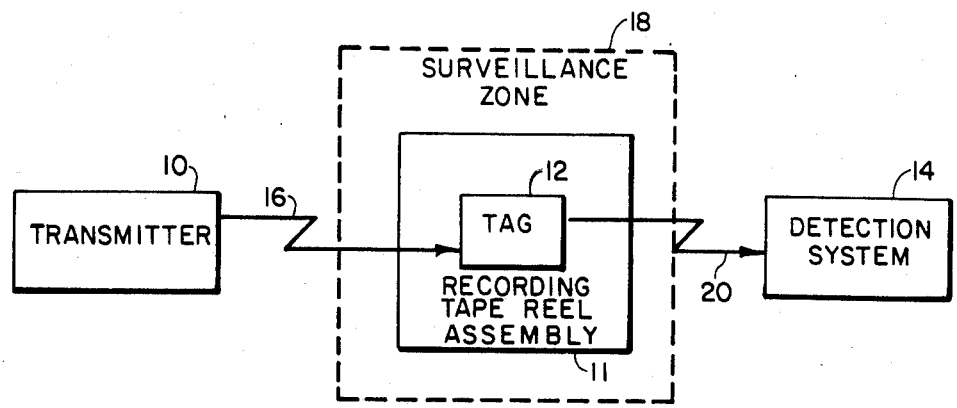
FIG. 1 is a block diagram illustrating the use of the recording-tape-reel assembly of the present invention in a presence detection system.

The recording-tape-reel assembly of the present invention may be detected in a presence detection system, as shown in FIG. 1. Such system includes a transmitter 10, a recording-tape-reel assembly 11 containing an electronic tag 12, and a detection system 14.

The electronic tag included in the preferred embodiments of the recording-tape-reel assembly of the present invention includes a frequency divider, such as described in U.S. Pat. No. 4,481,428 to Lincoln H. Charlot, Jr.

The transmitter 10 transmits an electromagnetic radiation signal 16 of a first predetermined frequency into a surveillance zone 18. The tag 12 detects the signal 16 and responds thereto by radiating electromagnetic radiation 20 of a second frequency that is one-half the first predetermined frequency.

The detection system 14 detects the electromagnetic radiation 20 at the second frequency, and thereby detects the presence of the recording-tape-reel assembly 11 containing the electronic tag 12 within the surveillance zone 18.

Figure 2:
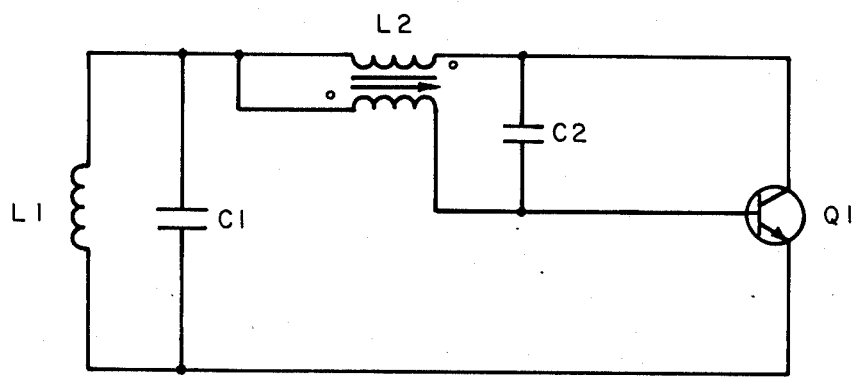
FIG. 2 is a schematic circuit diagram of a preferred embodiment of the electronic tag used in the assembly of the present invention.

Referring to FIG. 2, the preferred embodiment of the frequency divider included in the electronic tag 12 includes first and second coils L1 and L2, first and second capacitances C1 and C2 and a transistor Q1. The coil L1 and the capacitance C1 are connected to form a first resonant LC circuit that detects electromagnetic radiation at the first predetermined frequency. The coil L2 and the capacitance C2 are connected to form a second resonant LC circuit that is coupled to the first resonant LC circuit by the transistor Q1 to respond to detection of electromagnetic radiation at the first predetermined frequency by the first resonant LC circuit by radiating electromagnetic radiation at the second frequency.

Figure 3:
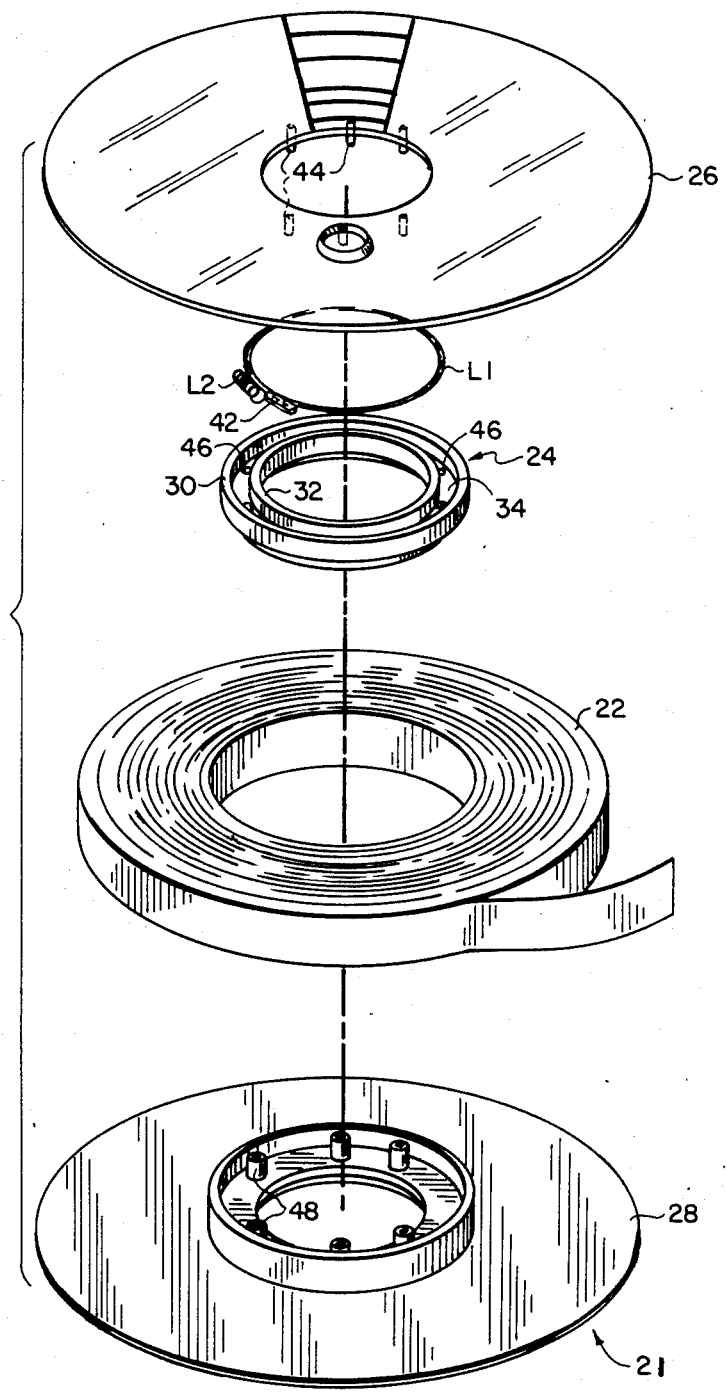
FIG. 3 is an exploded view of one preferred embodiment of the assembly of the present invention.
Figure 4:
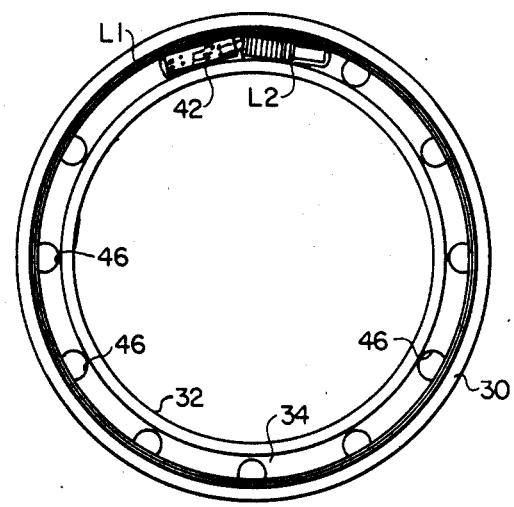
FIG. 4 is a top plan view of the hub shown in FIG. 3, with the components of the electronic tag positioned therein.
Figure 5:
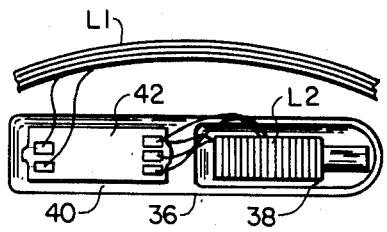
FIG. 5 is an enlarged broken-away portion of the hub showing the positioning of certain components of the electronic tag.
Figure 8:
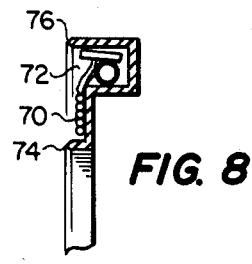
FIG. 8 is a sectional view taken along lines 8—8 in FIG. 7.
Figure 7:
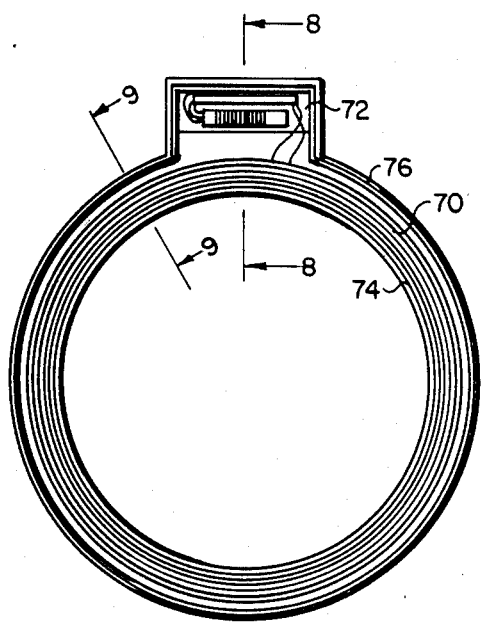
FIG. 7 is a bottom plan view of the integral component with the electronic tag attached thereto.
Figure 9:
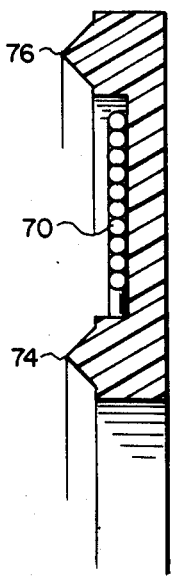
FIG. 9 is an enlarged sectional view taken along lines 9—9 in FIG. 7.
Figure 6:
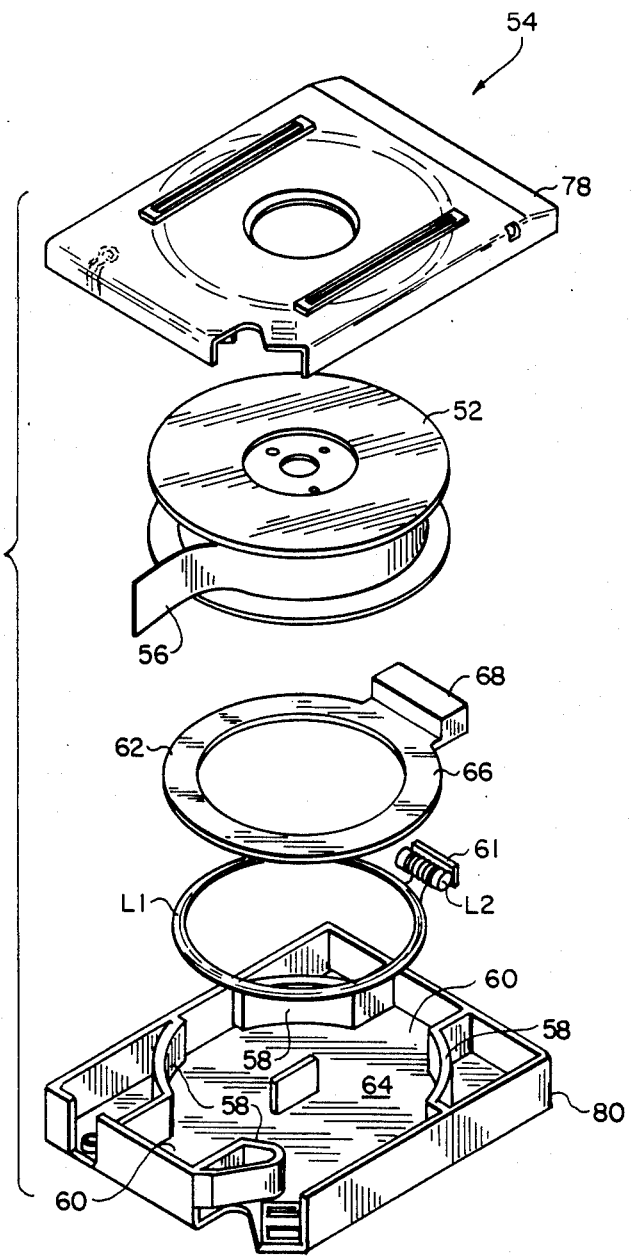
FIG. 6 is an exploded view of another preferred embodiment of the assembly of the present invention.

One preferred embodiment of a recording-tape-reel assembly according to the present invention is shown in FIGS. 3, 4 and 5. The assembly includes a reel 21 for holding a recording tape 22. The reel includes a hub 24 on which the tape 22 is wound and two flanges 26 and 28 attached on opposite sides of the hub 24. The flanges 26, 28 restrain lateral movement of the tape 22 as the tape is being wound onto or unwound from the hub 24. One flange 26 is transparent for viewing how much tape is on the reel 21.

The exterior side of the hub 24 that is attached to the flange 26 includes a pair of coaxial walls 30, 32 that define a slot 34, which is circular and coaxial with the hub 24. The slot 34 is coaxial with the hub 24 so as not to unbalance the hub 24 with respect to its axis.

The first coil L1 of the electronic tag has a diameter that is less than the outside diameter of the slot 34 and is coaxially positioned in the slot 34.

The hub 24 further defines a depression 36 in the slot 34, which is radially equidistant from the hub axis as the slot 34. The depression 36 includes a first section 38 and a second section 40.

The second coil L2 of the electronic tag has a diameter that is less than the width of the slot 34 and is positioned in the first section 38 of the depression 36 in the slot 34 orthogonally to the first coil L1.

The other components of the electronic tag, the capicitances C1, C2 and the transistor Q1, are embodied in a printed circuit board 42 which is positioned in the second section 40 of the depression 36 in the slot 34.

The volume of the depression 36 is such as to replace a portion of the hub 24 having a mass sufficiently close to the combined mass of the second coil L2 and the printed circuit board 42 so as not to substantially unbalance the hub 24 when the electronic tag is positioned therein.

The flange 26 covers the slot 34 to isolate the electronic tag L1, L2, 42 from the tape 22 and to make the tag inaccessible to users of the assembly.

The assembly is completed by connecting the flange 26 to the flange 28 by means of studs 44 extending from the flange 26, which pass through holes 46 and the slot 34 of the hub 24 and are seated in sockets 48 in the flange 28. If the hub 24 is chosen from hub stock containing twice as many holes 46 as there are studs 44, and the sections 38 and 40 of the depression 36 are on opposing sides of one of such holes, it is important that such hole in the stock hub be filled in so that a stud 44 does not pass therethrough and sever a connection between the second coil L2 and the circuit board 42 when the flanges 26, 28 are connected together.

Another preferred embodiment of a recording-tape-reel assembly according to the present invention is shown in FIGS. 6, 7, 8 and 9. In this embodiment, a reel 52 is contained in a cassette 54. A tape 56 is wound on the reel 54.

The cassette 54 has interior segmented generally circular sidewalls 58 for restraining tangential movement of the tape as it is being wound onto or unwound from the reel 52. There are recesses 60 within the cassette 54 between the sidewall segments.

The electronic tag, which consists of coil L1, coil L2 and a printed circuit board 61 containing the capicitances C1, C2 and the Q1, is positioned in an enclosed compartment that is defined by sealing an integral component 62 about its periphery to an inner wall 64 of the cassette 54 to isolate the tag from the tape 56 and to make the tag inaccessible to users of the cassette 54.

The component 62 has both a ring-shaped portion 66 and a box-shaped portion 68 at the outer edge of the ring. When the component 62 is sealed to the inner cassette wall 64, the ring-shaped portion 66 defines a first chamber 70 parallel to the cassette wall 64; and the box-shaped portion 68 defines a second chamber 72.

The first coil L1 has a flat planar configuration and a diameter corresponding to that of the ring-shaped first chamber 70. The first coil L1 is secured to the ring-shaped portion 66 on the inside of the chamber 70.

The second coil L2 and the printed circuit board 61 are secured within the box-shaped portion 68. The second coil L2 is positioned orthogonally to the first coil L1. The box-shaped portion 68 of the integral component 62 is positioned within one of the recesses 60 inside the cassette 54.

The integral component 62 has ridges 74, 76 about both its inner and outer periphery to define the depth of the compartment formed when the integral component 62 is sealed to the inner cassette wall 64. The ridges 74, 76 terminate in 90 degree cones for facilitating ultrasonic sealing of the integral component 62 to the inner wall 64.

The first chamber 70 and the second chamber 72 are interconnected so that the first coil L1 can be connected to the other components of the electronic tag.

The outer casings 78 and 80 of the cassette 54 are ultrasonically sealed together to complete the assembly of the cassette.

What is claimed is:

1. A recording-tape-reel assembly, comprising
a reel for holding a recording tape;
an electronic tag for enabling detection of the presence of the assembly in a presence detection system; and
means for housing the electronic tag in the assembly so that the electronic tag is isolated from said tape and is inaccessible to users of the assembly;
wherein the reel comprises a hub on which said tape is wound and flanges attached on opposite sides of the hub;
wherein one exterior side of the hub defines a slot;
wherein the tag is disposed in said slot; and
wherein one of the flanges covers the slot to isolate the tag from said tape and to make the tag inaccessible to users of the assembly.

2. An assembly according to claim 1,
wherein the tag includes first and second inductance coils;
wherein the exterior side of the hub defining the slot includes a pair of coaxial side walls such that the defined slot is circular and coaxial with the hub;
wherein the first coil has a diameter less than the outside diameter of the slot and is coaxially positioned in the slot; and
wherein the second coil has a diameter less than the width of the slot and is positioned in the slot orthogonally to the first coil.

3. An assembly according to claim 2,
wherein the hub further defines a depression in the slot;
wherein the second coil and any other components of the electronic tag are positioned in the depression; and
wherein the volume of the depression is such as to replace a portion of the hub having a mass sufficiently close to the combined mass of the second coil and said other electronic tag components so as not to substantially unbalance the hub when the electronic tag is positioned therein.

4. A recording-tape-reel assembly, comprising
a reel for holding a recording tape;
an electronic tag for enabling detection of the presence of the assembly in a presence detection system; and
means for housing the electronic tag in the assembly so that the electronic tag is isolated from said tape and is inaccessible to users of the assembly;
wherein the reel is contained within a cassette that includes interior walls defining an enclosed compartment that is isolated from the tape and inaccessible the users of the device;

wherein the tag is positioned in the compartment;
wherein the tag includes first and second inductance coils;
wherein the compartment has two interconnected chambers, including one chamber that is circular and parallel to one wall of the cassette;
wherein the first coil has a diameter corresponding to the diameter of the circular chamber and is positioned in the circular chamber; and
wherein the second coil is positioned in the other chamber orthogonally to the first coil.

5. An assembly according to claim 4,
wherein the compartment is defined by an integral component having both a ring-shaped portion defining the first chamber and a box-shaped portion defining the second chamber at the outer edge of the ring, with said integral component being sealed about its periphery to an inner wall of the cassette.

* * * * *